United States Patent
Mason, Jr. et al.

(10) Patent No.: US 6,665,740 B1
(45) Date of Patent: Dec. 16, 2003

(54) LOGICAL VOLUME SELECTION IN A PROBABILITY-BASED JOB SCHEDULER

(75) Inventors: Robert S. Mason, Jr., Mendon, MA (US); Adi Ofer, Wellesley, MA (US); Natan Vishlitzky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/439,903

(22) Filed: Nov. 12, 1999

(51) Int. Cl.[7] .................................................. G06F 3/00
(52) U.S. Cl. .................... 710/6; 710/5; 710/7; 711/112; 711/114
(58) Field of Search ................................ 709/103, 104, 709/105; 710/5, 36, 107, 112, 1, 7; 711/100, 115, 114, 112

(56) References Cited

U.S. PATENT DOCUMENTS

| | | | | |
|---|---|---|---|---|
| 4,633,387 A | * | 12/1986 | Hartung et al. | 364/200 |
| 5,249,290 A | * | 9/1993 | Heizer | 395/650 |
| 5,381,546 A | * | 1/1995 | Servi et al. | 395/650 |
| 5,408,663 A | * | 4/1995 | Miller | 395/650 |
| 5,546,535 A | * | 8/1996 | Stallmo et al. | 395/182.07 |
| 5,819,310 A | | 10/1998 | Vishlitzky et al. | |
| 5,937,428 A | * | 8/1999 | Jantz | 711/114 |
| 6,112,257 A | * | 8/2000 | Mason, Jr. et al. | 710/18 |
| 6,145,028 A | * | 11/2000 | Shank et al. | 710/31 |
| 6,324,580 B1 | * | 11/2001 | Jindal et al. | 709/228 |
| 6,434,637 B1 | | 8/2002 | D'Errico | |

* cited by examiner

Primary Examiner—John Follansbee
Assistant Examiner—Diem Cao
(74) Attorney, Agent, or Firm—Daly, Crowley & Mofford, LLP

(57) ABSTRACT

A scheduler for selecting a logical volume for job generation based on the loading of physical resources in a data storage system. The scheduler determines a job workload for each of the physical resources, selects physical resources based on the job workload and selects a logical volume supported by the selected physical resources in a balanced manner.

43 Claims, 10 Drawing Sheets

LOGICAL VOLUME SELECTION IN A PROBABILITY-BASED JOB SCHEDULER

BACKGROUND OF THE INVENTION

The invention relates generally to data storage systems, and in particular, to job scheduling for I/O requests directed to devices in data storage systems.

In typical data storage systems, a storage controller serves as an interface between external host computers and the physical storage devices of the data storage system, and thus controls all back-end (or device-side) operations. The back-end operations can include services for read misses, as well as write destaging, read prefetching, RAID, data copy and other types of background operations. The scheduling of these types of operations has a major effect on the performance of the data storage system as a whole.

In prior art data storage systems, the storage controller typically strives to provide the lowest response time possible for host-waiting type operations (e.g., read misses) at the expense of its background duties. Favoring the host requests in this manner tends to starve the background operations. Moreover, when there are no pending host requests, the storage controller schedules a background operation for a logical device and decisions regarding the logical device selection are made entirely at the logical level.

Such an approach can have a detrimental impact on daa storage system performance. For instance, the execution of pending background operations requests that have accumulated in significant number while higher priority host requests were serviced can create a bottleneck for back-end operations. Also, the scheduling of jobs at the logical level can result in an uneven workload distribution at the physical level. That is, some physical resources (e.g., buses, physical storage devices, etc.) may be over-utilized while other physical resources are under-utilized.

SUMMARY OF THE INVENTION

This invention relates to a job scheduler that considers the loading of physical resources in a data storage system in selecting a logical volume for new job generation.

In an aspect of the invention, scheduling I/O requests directed to logical volumes that are associated with physical resources of a data storage system includes determining a job workload for each of the physical resources, choosing at least one of the physical resources based on the job workload and selecting one of the logical volumes associated with the chosen at least one physical resource. Once a logical volume has been selected, an I/O request directed to the selected one of the logical volumes is selected.

Embodiments of the invention may include one or more of the following features.

The physical resources can include Direct Memory Access (DMA) paths or "pipes" having at least one I/O bus for accessing physical devices. The workload determination can include determining the number of pending jobs associated with each of the pipes. Choosing one of the physical resources can include selecting one of the pipes based on the determined number of pending jobs associated with the pipes. The chosen one of the pipes is associated with a lowest number of pending jobs. The chosen one of the pipes can also be associated with a lowest number of pending jobs not in excess of a predetermined maximum pipe threshold number. If at least two of the pipes have a lowest number of pending jobs, then choosing at least one of the physical resources can include determining which of the at least two of the pipes is idle and, if more than one of the at least two of the pipes is idle, selecting from more than one of the at least two of the pipes. Selecting from more than one of the at least two of the physical devices is performed in a round robin manner. If only one of the at least two of the pipes is idle, the idle one of the at least two of the pipes is selected. Alternatively, if only one of the at least two of the pipes is idle, then the idle one of the at least two of the pipes is selected if the number of pending jobs is not in excess of the predetermined maximum pipe threshold number.

The physical resources can further include physical devices connected to the at least one I/O bus of each of the pipes. Choosing at least one physical resource can include determining the number of active jobs associated with each of the physical devices and selecting one of the physical devices based on the determined number of pending jobs associated with each of the physical devices. The selected one of the physical devices can be associated with a lowest number of pending jobs. Alternatively, the selected one of the physical devices can be associated with a lowest number of pending jobs not in excess of a predetermined maximum physical device threshold number. If at least two of the physical devices have a lowest number of pending jobs, then choosing the at least one of the physical resources can include selecting the one physical device having a next higher number of pending jobs than a most recently selected one of the physical devices. Alternatively, if at least two of the physical devices have a lowest number of pending jobs, choosing at least one of the physical resources includes selecting one of the physical devices having a next higher number of pending jobs than a most recently selected one of the physical devices not in excess of the predetermined maximum physical device threshold number.

Selecting one of the logical volumes can include determining a least recently selected one of those of the logical volumes associated with the selected one of the physical devices and selecting the least recently selected one.

The I/O scheduling can further include determining if any of the I/O requests are host I/O requests and, if any of the I/O requests are determined to be host I/O requests, deciding whether or not the host I/O requests are to be considered for scheduling. Deciding whether or not the host I/O requests are to be considered for scheduling can include using a parameter corresponding to the probability that the host I/O requests will be considered for scheduling if one or more of the I/O requests are not host I/O requests. One of any of the I/O requests determined to be host requests is selected if it is decided that the host I/O requests are to be considered for scheduling.

Among the advantages of the scheduling mechanism of the invention are the following. The scheduling mechanism provides the lowest response time possible for host requests while still performing its background duties in a timely manner. Additionally, because it uses a "bottom-up" approach to the selection of logical volumes, that is, it selects a pipe, then a physical device on that pipe, and then a logical volume on the selected physical device, overall system performance is much improved. Such an approach considers physical load balancing during the scheduling of background operations. Also, the total number of supported logical volumes is far greater than the number of physical resources, so considering the fewer physical resources for job scheduling purposes is more efficient.

BRIEF DESCRIPTION OF THE DRAWINGS

Other features and advantages of the invention will be apparent from the following description taken together with the drawings in which.

DETAILED DESCRIPTION

Figure 1:
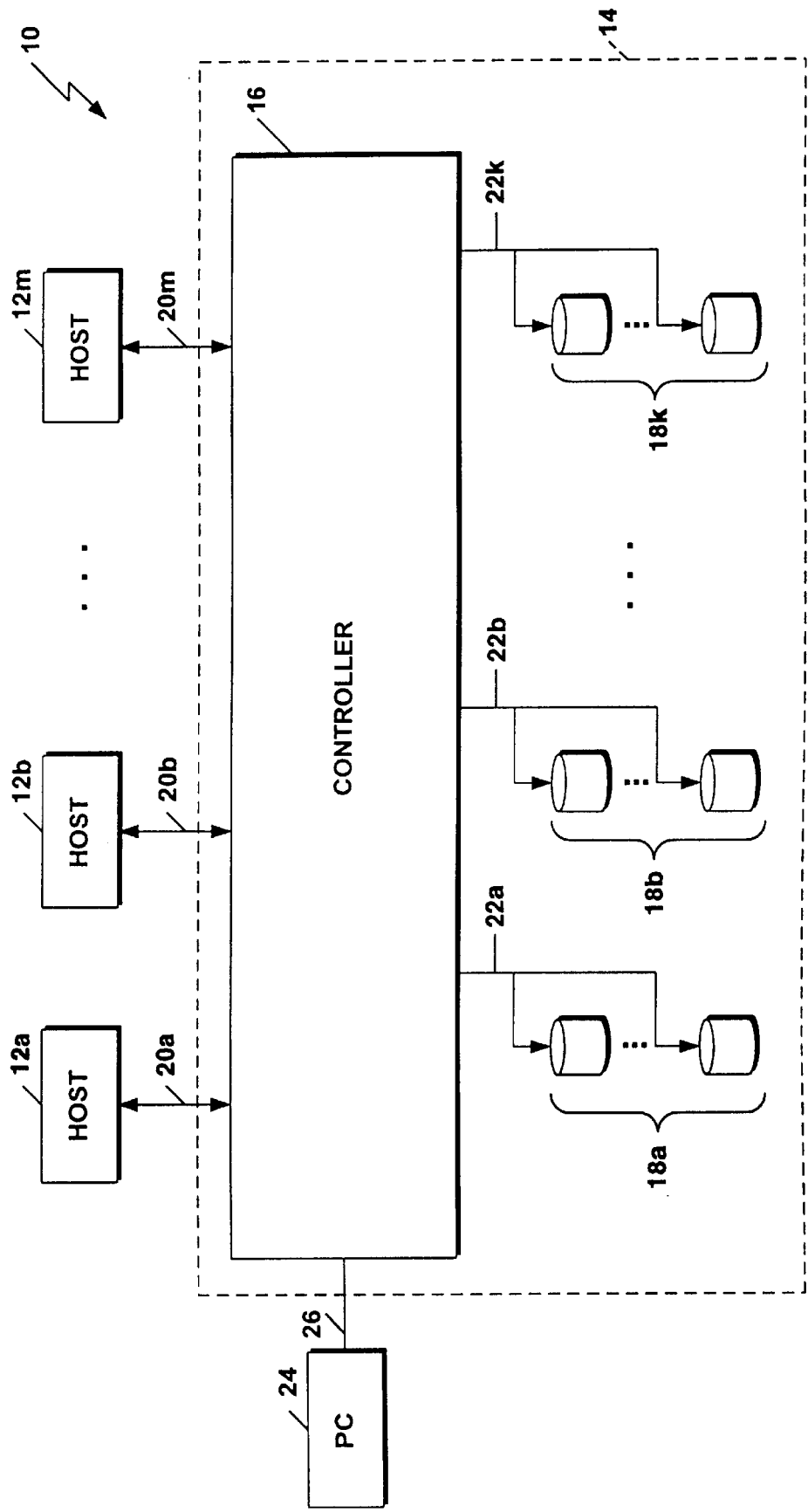
FIG. 1 is a block diagram of a data storage system in which the invention can be employed.

Referring to FIG. 1, a data processing system 10 includes a plurality of host computers 12a, 12b, . . . , 12m, connected to a data storage system 14. The data storage system 14 receives data and commands from, and delivers data and responses to, the host computers 12. The data storage system 14 is a mass storage system having a controller 16 coupled to pluralities of physical storage devices (or, simply, physical devices) shown as physical disks 18a, physical disks 18b, . . . , physical disks 18k. Each of the physical devices 18 is logically divided, in accordance with known techniques, into one or more logical volumes.

The controller 16 interconnects the host computers 12 and the physical devices 18, and can be, for example, that made by EMC and known as the Symmetrix controller. The controller 16 thus receives memory write commands from the various host computers over buses 20a, 20b, . . . , 20m, respectively, for example, connected and operated in accordance with a SCSI protocol, and delivers the data associated with those commands to the appropriate physical devices 18a, 18b, . . . , 18k, over respective connecting buses 22a, 22b, . . . , 22k. Buses 22 also preferably operate in accordance with a SCSI protocol. The controller 16 also receives read requests from the host computers 12 over buses 20, and delivers requested data to the host computers 12, either from a cache memory of the controller 16 or, if the data is not available in cache memory, from the physical devices 18.

In a typical configuration, the controller 16 also connects to a console PC 24 through a connecting bus 26. Console PC 24 is used for maintenance and access to the controller 16 and can be employed to set parameters of the controller 16 as is well known in the art.

Figure 2:
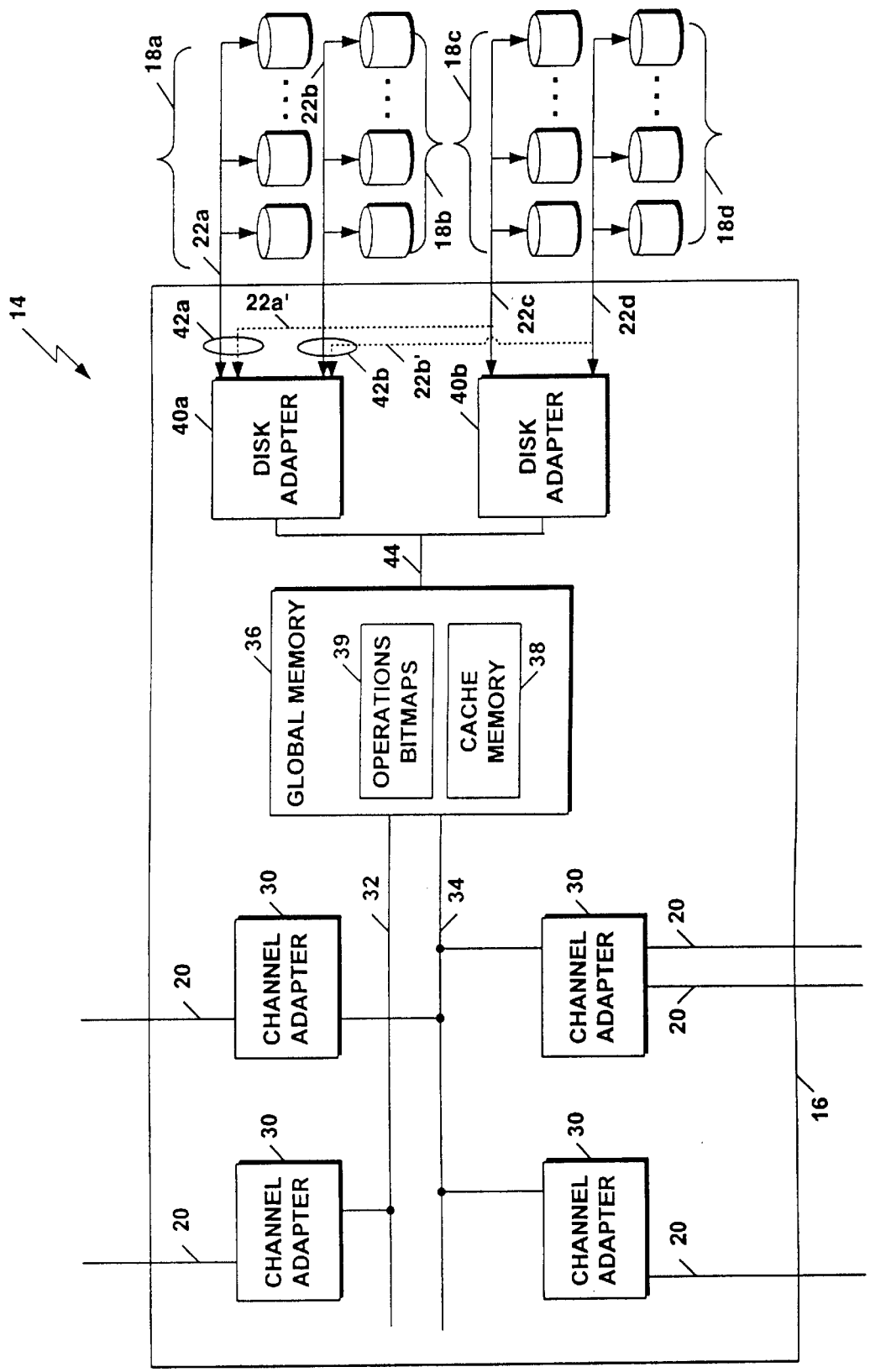
FIG. 2 is a detailed block diagram of the controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the EMC Symmetrix controller as an illustrative example, the communications from the host computer 12 typically connects to a port of a plurality of channel adapters 30 over the SCSI bus lines 20. Each channel adapter, in turn, connects over one or more system busses 32 or 34 to a global memory 36. The global memory includes a cache memory 38 for storing data, as well as various data structures for maintaining control information and for supporting communications between the host computers 12 and the physical devices 18. These data structures include operations bit maps 39, which maintain job workload information for the physical devices 18 and are utilized by the controller 16 in a manner to be described.

Also connected to the global memory 36 are device adapters shown as disk adapters 40, which control the physical devices 18. Thus, the channel adapters 30 can communicate with the disk adapters 40 through the global memory 36. In the preferred embodiment, the disk adapters are installed in controller 16 in pairs. Thus, for simplification, only two disk adapters, indicated as disk adapters 40a and 40b, are shown. However, it will be understood that additional disk adapters may be employed by the system.

Each of the disk adapters 40a, 40b supports four bus ports. The disk adapter 40a connects to two primary buses 22a and 22b, as well as two secondary busses 22a' and 22b'. The buses are implemented as 16-bit ultra-wide SCSI busses. The two secondary busses 22a' and 22b' are added for redundancy. Connected to each of the primary buses 22a, 22b, are the plurality of physical devices (shown as disk drive units) 18a and 18b, respectively. Connected to the primary buses 22c, 22d are the plurality of physical devices 18c and 18d, respectively. The secondary buses 22a' and 22b', which correspond to the primary buses 22a and 22b, respectively, are connected to respective primary buses 22c and 22d of disk adapter 40b and are active only when the disk adapter 40b is inoperative. That is, secondary buses 22a' and 22b' serve to couple the disk adapter 40a to the plurality of physical devices 18c and 18d, respectively, when disk adapter 40b can no longer support those devices. Thus, the corresponding primary/secondary bus pairs, e.g., 22a and 22a', as well the disk adapter's supporting bus interface logic (not shown) form a single DMA path, referred to herein as a "pipe", through which all back-end operations data transfers for the associated physical devices must pass. More specifically, each disk adapter 40 has two such pipes. As shown in the figure, the disk adapter 40a has a first pipe (pipe0) 42a and a second pipe (pipe1) 42b. The secondary buses and pipes of the disk adapter 40b have been omitted from the figure for purposes of clarity. Although only two pipes per disk adapter and two buses per pipe are shown, the system implementation need not be so limited.

The disk adapters 40 also communicate with the global memory 36 over dedicated buses 44. During a write operation, the disk adapters 40 read data stored in the global memory 36 by a channel adapter 30 and write that data to the logical volumes for which they are responsible. During a read operation and in response to a read command, the disk adapters 40 read data from a logical volume and write that data to global memory for later delivery by the channel adapter to the requesting host computer.

Figure 3:
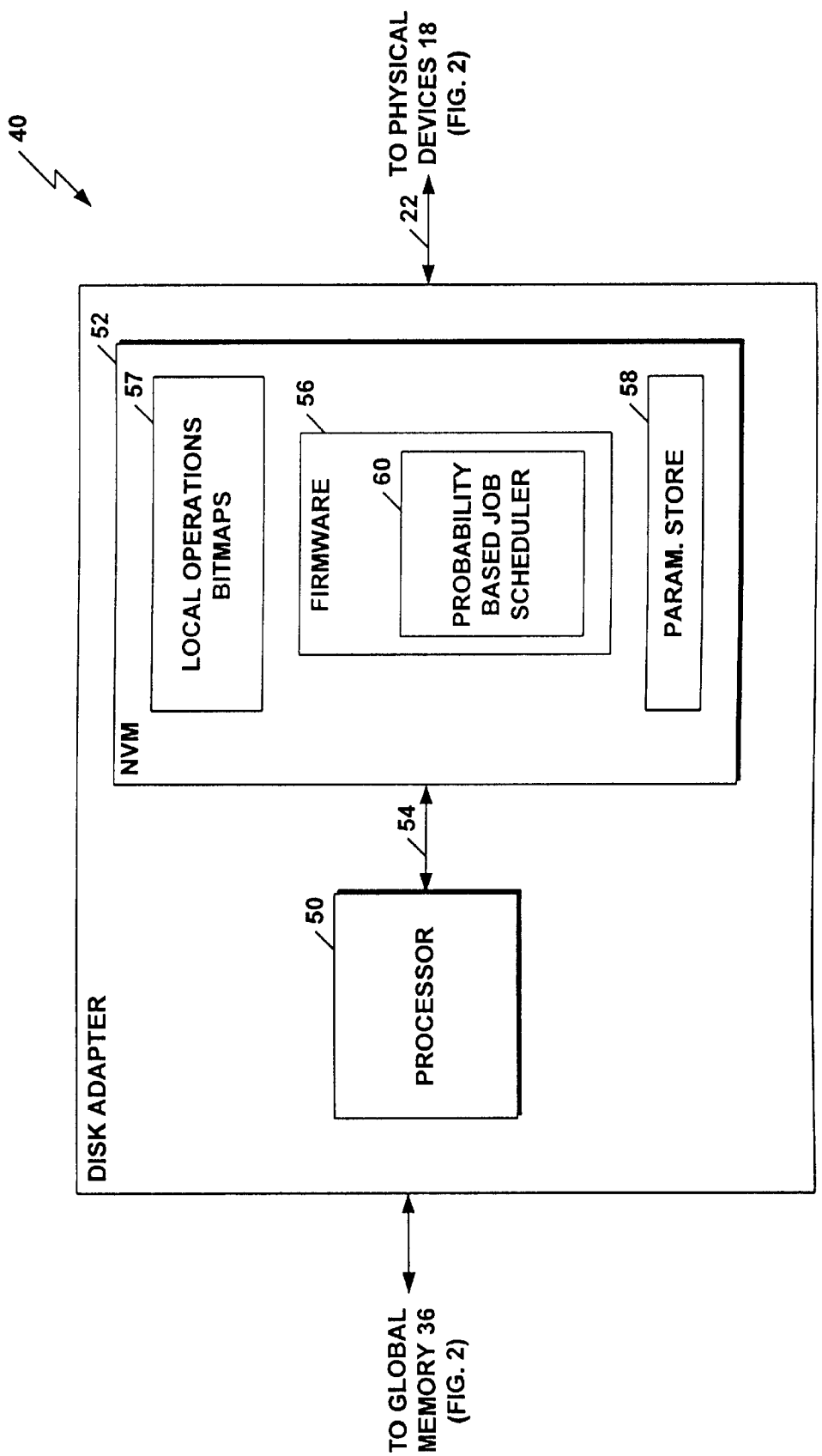
FIG. 3 is a block diagram of the disk adapter shown in FIG. 2.

As shown n FIG. 3, each disk adapter 40 includes a processor 50 coupled to a local, nonvolatile memory (NVM) 52 by an internal bus 54. The processor 50 controls the overall operations of the disk adapter and communications with the local memory 52. The local memory 52 stores firmware 56, control data structures, e.g., local operations bitmaps 57 and parameter data stored in a parameter store 58, and which is read each time the data storage system 10 is initialized. Included as a component of the firmware 56 is a job scheduler 60, which is copied to the processor's internal RAM (or external RAM, not shown), at initialization for subsequent execution by the processor 50.

The disk adapter 40 controls the back-end operations of the controller 16. These operations include services for read misses, write destaging, read prefetching, RAID, data copy, as well as other background drive operations.

Figure 4:
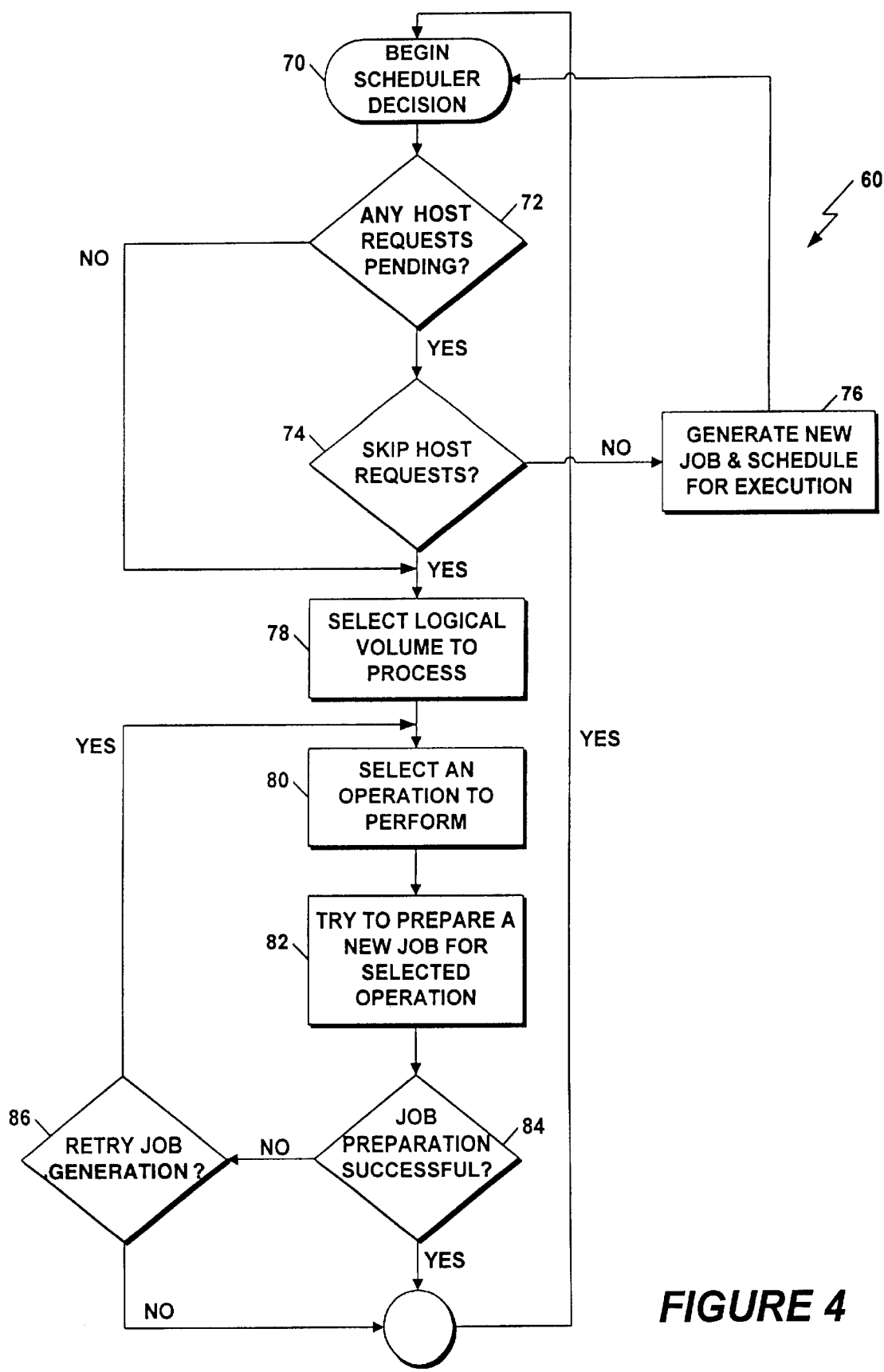
FIG. 4 is a flow diagram illustrating a job scheduling process which includes a logical volume selection process.

The job scheduler 60 has five levels or stages of operation: host request response (read miss, write miss operations); logical volume selection; operation prioritization and selection; job generation; and job dispatch and execution. Referring to FIG. 4, an overview of the job scheduler 60 is shown. The scheduler 60 commences a scheduling operation (step 70) and determines if any host requests are pending (step 72). If it determines that there is at least one host request pending, the scheduler 60 determines if the at least one pending host request should be skipped in favor of non-host requests (step 74). If this determination indicates that the host requests should not be skipped, but instead, should be given preferential treatment, the scheduler generates a new job and schedules that job for execution using known techniques (step 76). If the scheduler 60 determines that there are no host requests pending at step 72 or determines that the host requests should not be considered at step 74, the scheduler 60 identifies available physical resources to find the subset of logical volumes from which it can choose and then selects a logical volume (step 78). It is here that the new scheduling approach, which identifies and selects logical volumes according to the invention, is used. Once a logical volume is selected for processing, the scheduler selects an operation to be performed (step 80). At this point, the scheduler attempts to prepare a new job for the selected operation (step 82). The job generation is not always successful because of additional factors that could not be included in the scheduling decision. Thus, the scheduler determines whether or not the job preparation is successful (step 84). If the job preparation fails, the scheduler determines if a job generation retry operation is permitted (step 86). If so, the scheduler returns to the operation selection at step 80 to select a different operation for a new generation attempt. Otherwise, the process returns to the beginning of the scheduling operation. If a retry is not permitted, then the scheduler aborts the scheduling operation and returns to a next scheduling decision (step 70). Likewise, if the job generation is successful, then the scheduler 60 returns to step 70 for a next scheduling decision.

An example of a mechanism which can be used to perform the operation selection process 78 is described in a co-pending U.S. application entitled "Operation Prioritization and Selection in a Probability-Based Job Scheduler," in the name of Ofer et al., filed Nov. 12, 1999, and assigned Ser. No. 09/438,913, incorporated herein by reference. Other operation selection techniques that are known in the art can also be used. In the above-mentioned U.S. application, probabilities are assigned to different operation types within different priority-based classes of operations and form the basis for the operation selection.

The job scheduler 60, according to the invention, is a probability-based scheduler having initial considerations for host requests. Performance of the data storage system is usually measured with two metrics. One is total throughput or I/Os per second. The second is response time, usually measured in milliseconds. Response time refers to how fast the data storage system can respond to a host request. The best way to reduce response time is to keep the path between the host making requests and the disks serving the host requests as short as possible. To prevent starvation of background operations, a tunable probability parameter is assigned to the likelihood of executing a new host request. That is, the probability parameter sets the probability that a new host request will be considered when there are other waiting operations. As shown in Table 1 below, the probability value is initially set to 90%. If other non-host requests are waiting to be processed, then the probability of executing a new host request is 90%. Of course, if the host requests are not competing with any other types of requests, then they are always executed.

TABLE 1

| Other waiting operations? | Probability of executing new host request |
| --- | --- |
| No | 1.00 |
| Yes | 0.90 |

The above probabilities are used to determine whether or not the host requests should be skipped (at step 74, FIG. 4). Referring back to FIG. 4, step 74, a probability counter increments each time the scheduler comes to this decision point. Preferably, the 90% probability is evenly distributed over the count. That is, if the maximum count value is 100, every tenth count value in a count signals that any pending host requests should be skipped and a non-host request executed instead. These probability values may be fixed or they may be dynamically adjusted based on system load and I/O profile.

The logical volume selection 78 (FIG. 4), that is, selecting a logical volume for a background process, will now be described in further detail. As a whole, the system operates on the logical level, that is, on behalf of logical devices. However, in accordance with the invention, the physical level, i.e., the pipes, buses and the physical disks, is considered to ensure load balancing and keep the physical resources busier than they otherwise would be. The disk adapter 40 is the connecting point between the logical devices and the physical devices. Consequently, the disk adapter 40 receives I/O requests and performs some other jobs on the logical device level, but maps these requests and jobs to corresponding physical devices. To use the hardware resources of the system more efficiently, then, the disk adapter 40 takes into account the underlying physical resource utilization during job scheduling instead of scheduling job generation directly at the logical level. For example, if a first physical disk already has five queued commands and a second physical disk has no commands currently pending, the scheduler would generate a new job to the second physical disk (even though the next logical volume job would have used the first disk).

Figure 5:
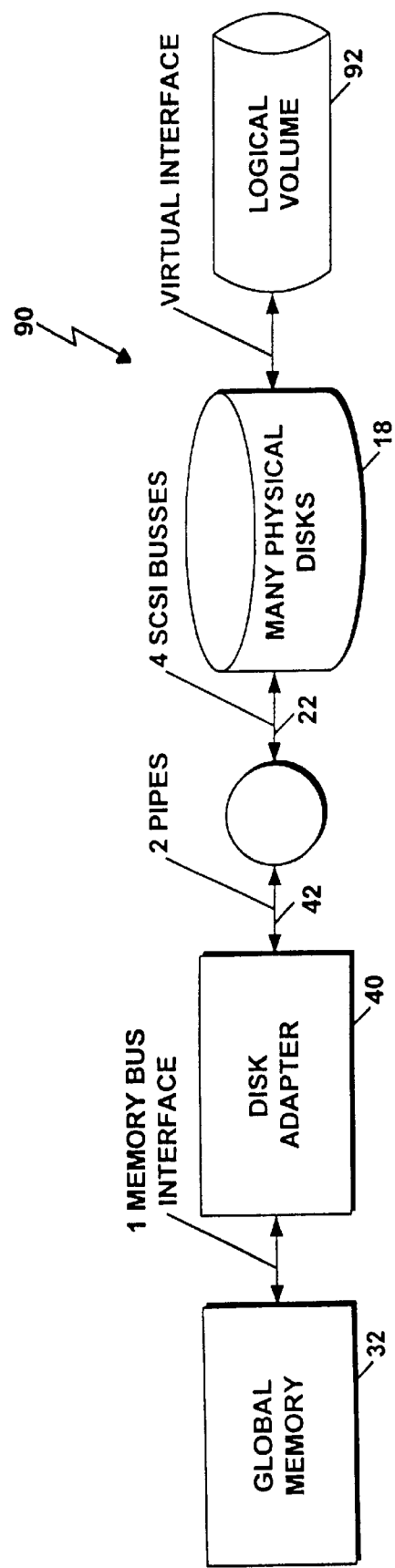
FIG. 5 is a schematic depiction of the physical and logical entities encountered when tracing data movement between the disk adapter (for FIGS. 2 and 3) and a logical volume on physical devices of the data storage system.

Referring to FIG. 5, a schematic of the physical layout of data flow 90, that is, the various physical and logical entities encountered as data flows from the global memory (on the back-end of the controller 16) to the physical disks 18, is shown. In one direction, the data directed to the logical device (or volume) 92 moves from the global memory 36 to one of the pipes 42, then to one of the I/O buses 22 on that pipe, and, finally, to one of the physical disks 18 on that I/O bus. Thus, potential bottlenecks along the way are the activities occurring on the logical device 92, the physical device 18, the bus 22 and the pipe 42. Accordingly, it is the objective of the job scheduler 60 to consider the loading of the physical structure of the data flow, as described above, when selecting which logical device is to create a next new job. This approach may be viewed as a bottom-up, hierarchical approach to logical volume selection.

Figure 6:
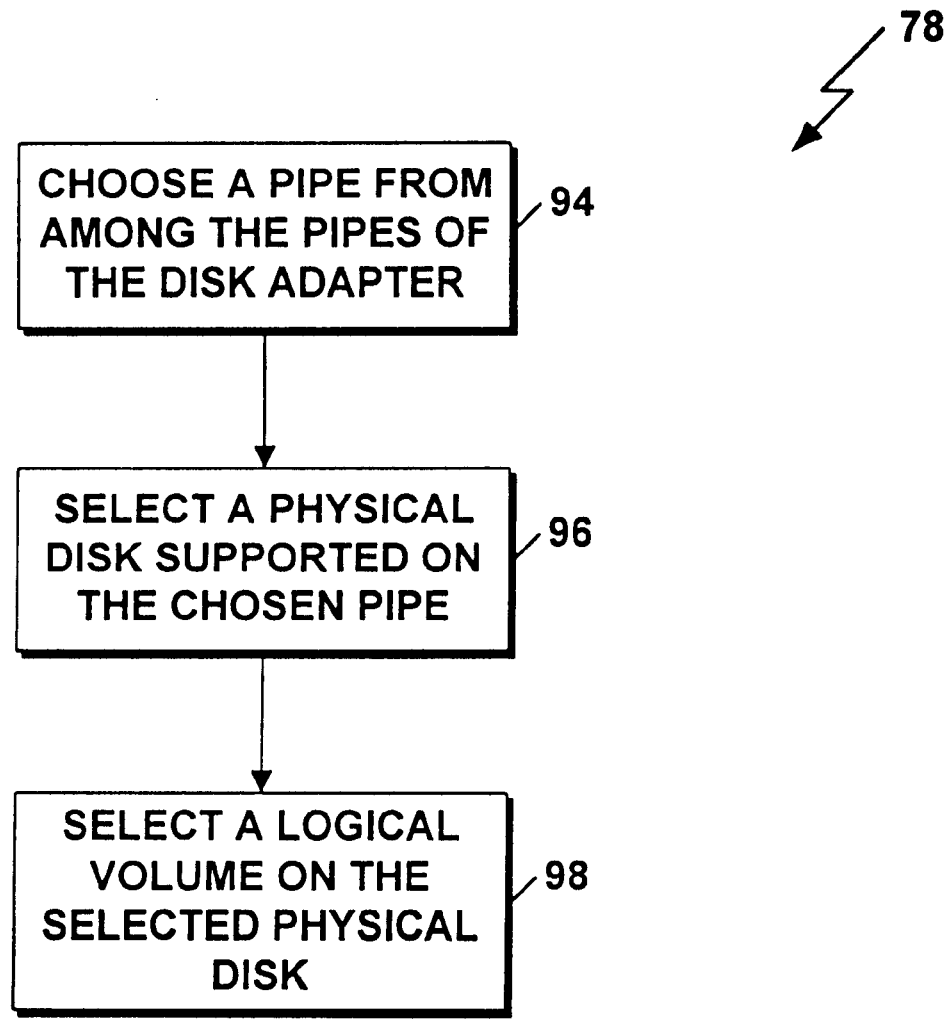
FIG. 6 is a flow diagram illustrating the logical volume selection process (of FIG. 4), which includes pipe selection and physical device selection processes.

Referring to FIG. 6, the logical device selection process 78 (from FIG. 4) first determines which pipe is to be used (for the purpose of new job creation) (step 94). Next, it decides which physical disk on that pipe is to be selected (step 96). Finally, once the physical disk has been selected, the logical device selection process 78 selects which logical device on the selected physical disk is to be used for the new job generation. In making such determinations, the following parameters need to be considered: the existing activity or load at the pipe level (e.g., whether or not the pipe is currently busy); the existing physical disk load (e.g., number of jobs presently dispatched and/or created); the existing logical device level load (e.g., number of jobs presently dispatched and/or created); run-time system wide parameters (e.g., high-priority write mode); and externally tunable parameters for modifying the scheduler.

Referring back to FIG. 2, the global memory 36 stores operations bitmaps 39 for tracking pending jobs. Each operation has an associated bitmap with a bit allocated for each logical volume in the system. For example, when a new read request directed to a particular logical volume is placed in a request buffer in the global memory 36 by one of the channel adapters 20 for the disk adapter 40 that supports that logical volume, a mailbox flag is raised by setting a bit in a read request bitmap for the targeted logical volume. In the described embodiment, the size of each operation's bitmap is 4096 bits (512 bytes) to represent all possible logical volumes supported by the system. These bits appear in the order of the logical volume number in the system (0–4095). Since the logical volumes are evenly distributed across the disk adapters, the bits representing the logical volumes supported by a single disk adapter are spread throughout a given bitmap. The system further provides for a logical OR'ing of the operations bitmaps to produces a flag for each logical volume indicating if the volume has any pending host-initiated or non-host initiated jobs to execute and places this flag in a New Task bitmap. Table 2 illustrates the job pending related operations bitmaps and their functions for the logical volume level.

TABLE 2

| Operations Bitmap Name | # of Bits | # of Bitmaps | Description |
| --- | --- | --- | --- |
| Read Request | 4096 | 1 | Indicates which logical volumes have host reads to perform (via mailbox flag). |
| Write Request | 4096 | 1 | Indicates which logical volumes have writes to perform. |
| Copy Request | 4096 | 1 | Indicates which logical volumes have copies to perform. |
| Prefetch Request | 4096 | 1 | Indicates which logical volumes have prefetches to perform. |
| Scrub Request | 4096 | 1 | Indicates which logical volumes have data scrubbing operations to perform. |
| RAID Request | 4096 | 1 | Indicates which logical volumes have RAID jobs to perform. |
| New Task | 4096 | 1 | Logical OR of all of the above bitmaps. |

All but the scrub and prefetch request operations bitmaps are stored in the global memory.

Given only the above structure of the operations bitmaps, finding jobs which are pending at a physical resource level is difficult. With a small number of resources like the number of pipes, it is conceivable to use a mask and logical AND the mask with the large bitmaps to find only the jobs applying to that pipe. This operation would be time-consuming, but it would only have to be done for two pipes. When this technique is expanded to determine which physical devices have jobs to perform, it becomes prohibitively expensive.

Therefore, new operations bitmaps corresponding to the physical resources are generated by scanning the New Task bitmap. They are stored in the local memory 52 (of the disk adapter 40), along with the prefetch and scrubbing request operations bitmaps shown in Table 2. The new bitmaps include two types of physical resource bitmaps corresponding to the two types of physical resources to be considered, i.e., the pipe and the physical disk.

Figure 7:
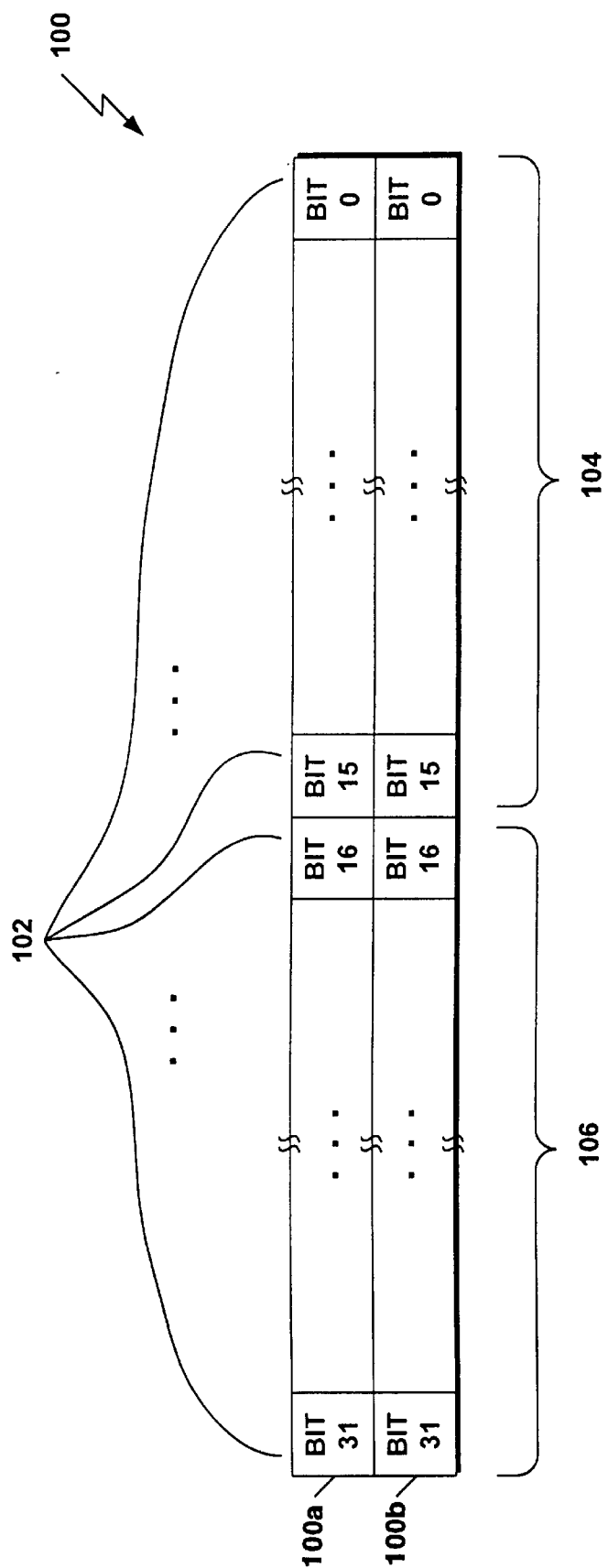
FIG. 7 is a depiction of pipe requests bitmaps used by the logical volume selection process of FIG. 6.

Referring to FIG. 7, pipe requests bitmaps 100 include a first pipe request bitmap 100a for the first pipe 42a and a second pipe request bitmap 100b for the second pipe 42b. As illustrated, each pipe request bitmap is 32-bits, with each bit 102 corresponding to one of the physical disks supported by each of two 16-bit SCSI buses. The least significant 16 bits are primary bus physical device jobs pending indicators 104, representing the status of corresponding physical disks residing on the primary bus 22. The most significant 16 bits are secondary bus physical device jobs pending indicators 106, representing the status of corresponding physical disks residing on the secondary bus 22'.

Figure 8:
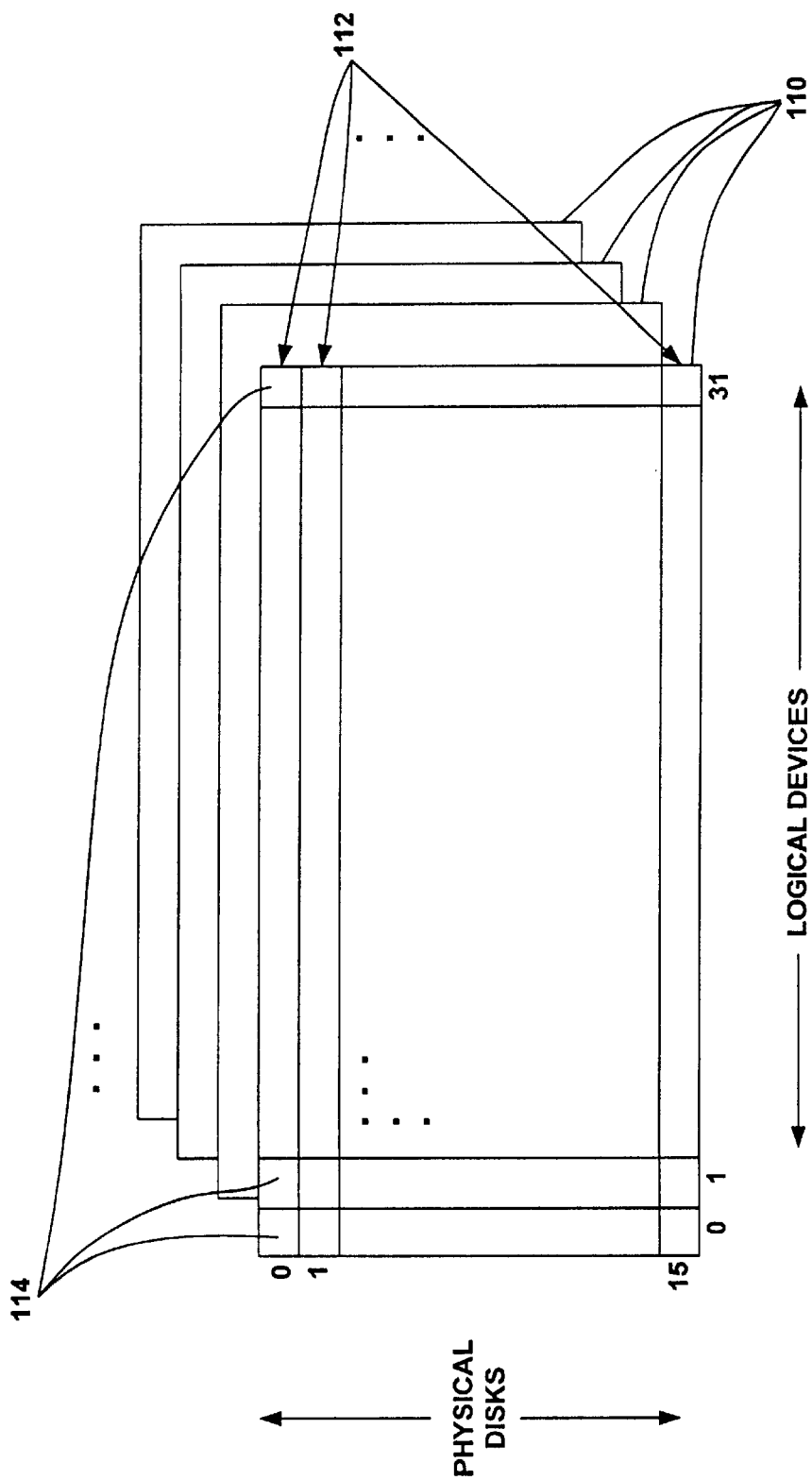
FIG. 8 is a depiction of physical disk requests bitmaps used by the logical volume selection process of FIG. 6.

Referring to FIG. 8, a plurality of physical request bitmaps 110, one such plurality 110 corresponding to each of the buses, i.e., the two pipe0-supported buses, and the two pipe1-supported buses, each include 16 physical request bitmaps 112. Thus, there is one physical request bitmap 112 for each of the 16 physical devices on each bus. Each of the physical request bitmaps include 32 logical volume jobs pending indicators 114, one for each of the supported logical volumes.

A description of the pipe and physical requests bitmaps is provided in Table 3 below.

TABLE 3

| Operations Bitmap Name | # of Bits | # of Bitmaps | Description |
| --- | --- | --- | --- |
| Pipe Request | 32 | 2 | Each pipe has a 32-bit bitmap indicating which of the physical disks attached to the pipe have pending jobs. The least significant 16 bits are for the primary bus on the pipe and the most significant bits are for the secondary bus on the pipe. |
| Physical Request | 32 | 64 | Each physical disk has a 32-bit bitmap indicating which logical devices on that physical device have pending jobs. |

The overhead for the generation and storage of the bitmaps 112 is a bit test and, if nonzero, two bit sets in the local memory 52, i.e., one in a pipe request bitmap and one in a physical request bitmap, for each logical volume in the system.

The scheduler 60 uses the pipe request bitmaps 112 to determine the existence of a free one of the pipes 100a, 100b for which a job may be generated. Because the pipe request bitmaps may not provide enough information to make a decision as to pipe selection in the event that both pipes have jobs pending (which is frequently the case), the disk adapter maintains for each of the pipes 100a, 100b an active jobs count corresponding to the number of currently active jobs on that pipe. This count is readily available from physical disk pending jobs counts maintained by the disk adapter for each physical disk.

Figure 9:
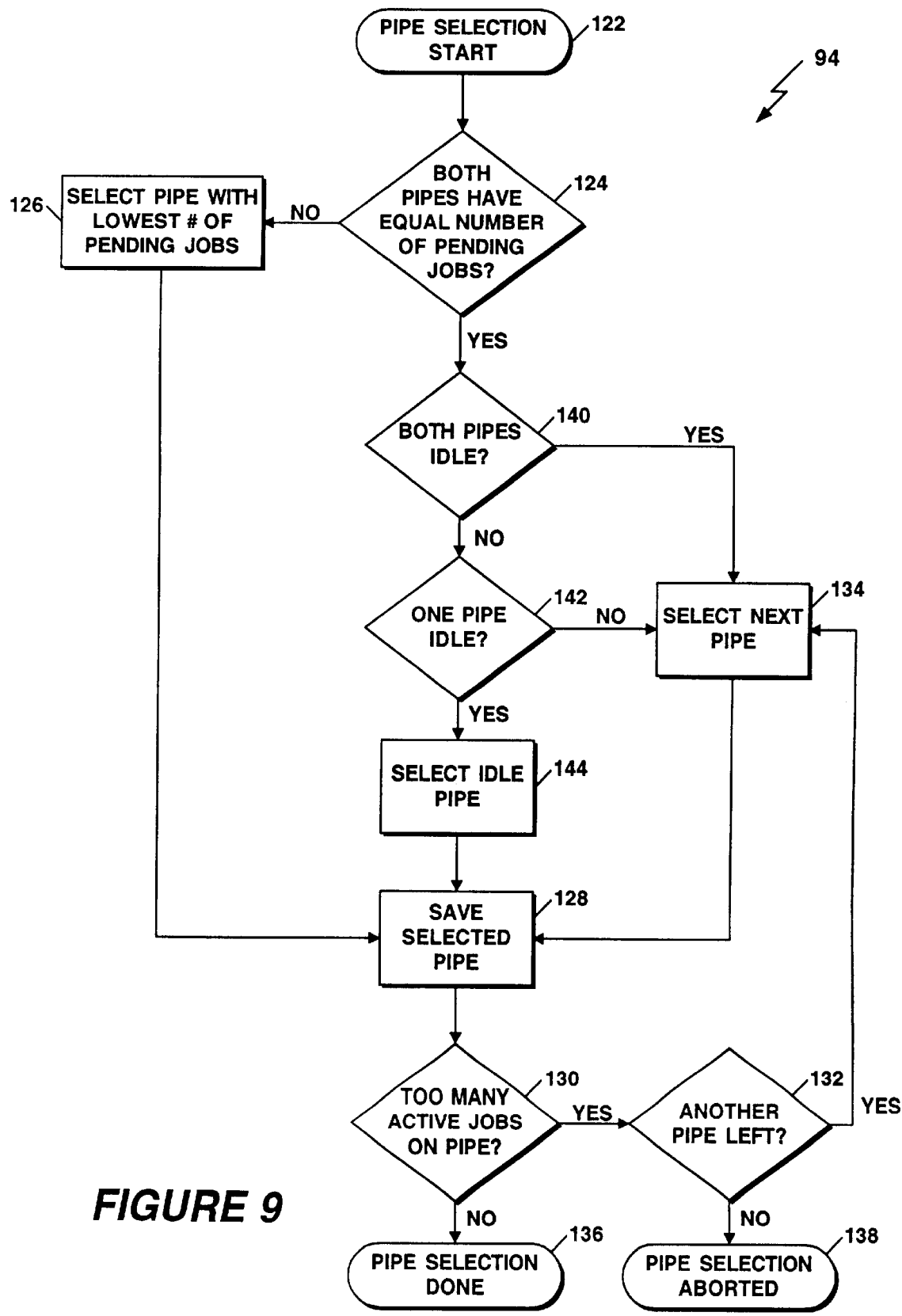
FIG. 9 is a flow diagram of the pipe selection process of FIG. 6.

Referring to FIG. 9, a pipe selection process 94, performed by the logical volume selection operation 78 (from FIG. 4), operates as follows. The pipe selection process 94 commences (step 122) and determines if all of the pipes (in this embodiment, there are only two) have an equal number of pending jobs (step 124) by reading the active jobs counts. If they do not, the process selects the pipe with the lowest number of pending jobs (step 126) and saves the selected pipe in the local memory (step 128). The pipe selection process then determines if there are too many active jobs on the selected pipe by comparing the number of active jobs (as indicated by the corresponding active jobs count) to a predetermined maximum pipe device threshold number (step 130). This predetermined threshold imposes a limit for the maximum number of jobs that may be active on a pipe at a give time, which helps reduce CPU overhead in generating new jobs when the pipes are already sufficiently queued with jobs. If the process determines that there are too many active jobs, the process determines if there are any nonselected pipes remaining as possible candidates for selection (step 132). If a possible candidate remains, the pipe selection process selects (in round robin fashion) the next pipe (step 134) and returns to step 128 to save the pipe selection. If, at step 130, the process determines that there are not too many active jobs on the selected pipe, the pipe selection is complete (step 136). That is, the most recently saved pipe selection is the pipe for which a job is to be generated. If, at step 132, the process determines that there are no nonselected pipes remaining, then no further selection is possible and the process terminates without making a selection (step 138).

Still referring to FIG. 9, if the process determines that both pipes have an equal number of pending jobs (at step 124), and that both pipes are idle (step 140), it selects the next pipe (step 134). A pipe is idle if it is not currently performing a Direct Memory Access (DMA). Once the pipe is selected, the process proceeds to step 128. If, at step 142, the process determines that only one pipe is idle, the process selects the idle pipe (step 144) and proceeds to step 128 to save the selection.

The above method gives preference to the pending job count when selecting a pipe. Alternatively, the pipe selection could include a weighted decision using the busy/idle state of the pipe and the pending job count.

Once a pipe has been chosen, any further decisions concerning physical resources are limited to the physical disks on that pipe. The physical disks associated with the selected pipe are ascertained by consulting the selected pipe's pipe and physical request bitmaps. Using those bitmaps, the process checks each physical device's bitmap to determine which of those physical devices has the least number of jobs already pending. A pointer to the last selected physical device is maintained to resolve equal count issues, as described below.

Figure 10:
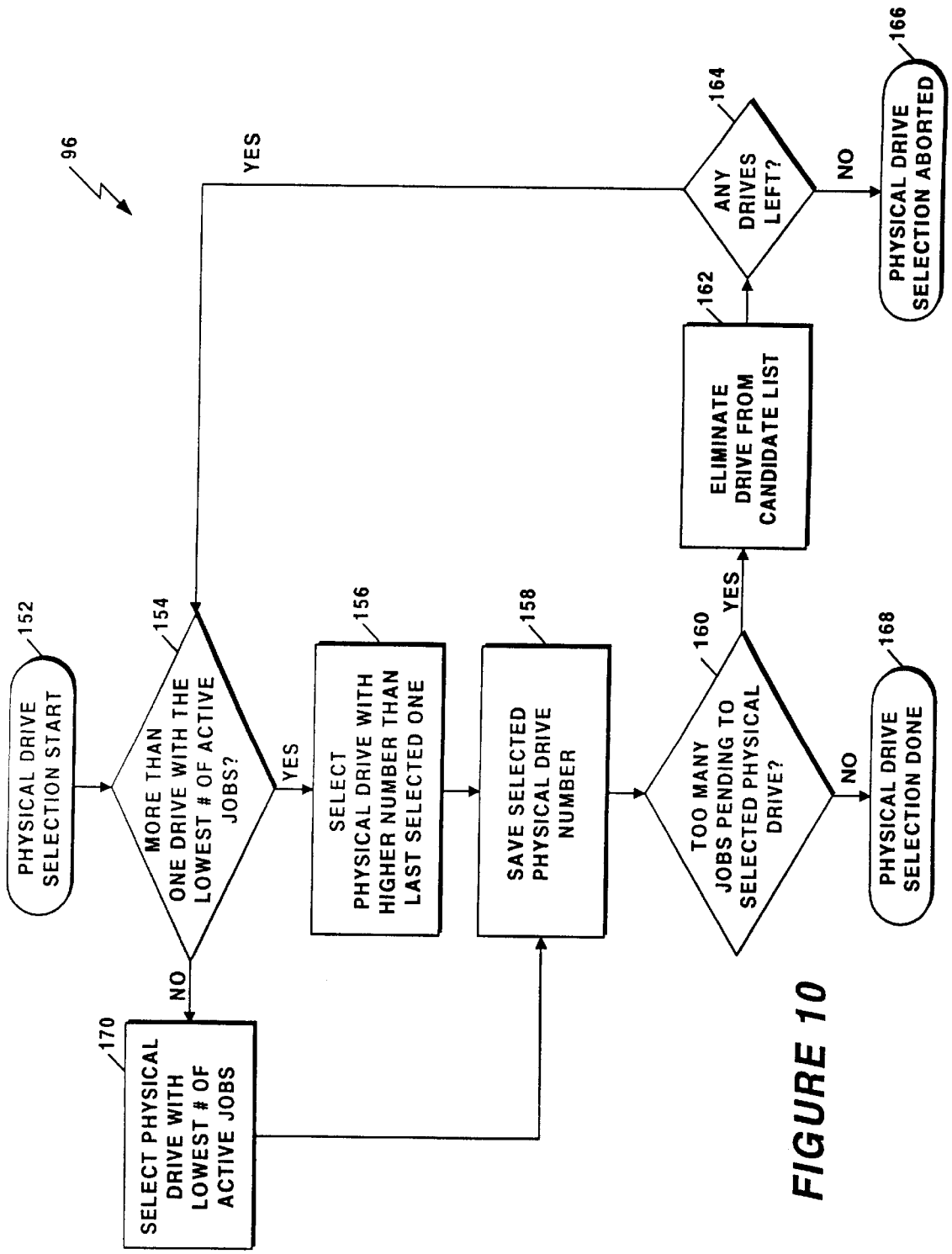
FIG. 10 is a flow diagram of the physical device selection process of FIG. 6.

Referring to FIG. 10, a physical device selection process 96 is shown. Once the process has commenced (step 152), it determines if there is more than one physical drive with the lowest number of active jobs (step 154). If so, the process uses a round robin mechanism to select from among the drives with the lowest number. That is, it uses the pointer to determine the last selected physical drive and selects the next physical drive that has a higher value (in the round robin) than the last selected drive (step 156). The process saves the number corresponding to the selected physical drive in the local memory (step 158). It then determines if there are too many jobs pending on the selected physical drive (step 160). If so, the process eliminates the selected drive from the candidate list (step 162) and determines if there are any candidate drives remaining (step 164). If there are no other drives which may be considered for selection, the selection operation is aborted (step 166). If another drive remains, the process returns to step 154. If there are not too many pending jobs at 160, the physical drive selection is complete (step 168).

Referring back to step 154, if the process determines that there is only one drive with the lowest number of active jobs, it selects that drive (step 170) and proceeds to step 158.

Once the physical drive has been selected, a logical volume on that physical drive is then selected. The earlier described Physical Request bitmap 110 (FIG. 8), which is used for the physical drive selection, is also used to select a logical volume for job generation. That is, the logical volume selection is accomplished by a round-robin polling of bits in the Physical Request bitmap for the selected pipe and the selected drive (i.e., a corresponding one of bitmaps 112 or bitmaps 114). The job scheduler maintains in the local memory 52 a logical volume pointer to the last selected logical volume. The polling begins at the logical volume pointed to by the logical volume pointer for that physical device to ensure fairness at the physical device level.

The input parameters required by the scheduler and stored in the parameter store 58 (FIG. 3) are shown in the table below.

TABLE 4

| Scheduler Input Parameter | Default Value | Units |
|---|---|---|
| ALG_DA_HOST_PROB | 90 | Percentage |
| ALG_DA_MAX_PIPE_JOBS | 100 | Count |
| ALG_DA_MAX_PHYS_JOBS | 60 | Count |

The host request probability (ALG_DA_HOST_PROB), as already discussed with reference to TABLE 1 above, is set to a default percentage value of 90. The predetermined maximum pipe threshold number corresponding to the maximum allowable number of jobs pending for a pipe (ALG_DA_MAX_PIPE_JOBS), discussed above with reference to FIG. 8, is set in this example to a maximum count value of 100. The predetermined maximum physical device threshold number of jobs that may be queued for a single physical device (ALG_DA_MAX_PHYS_JOBS), mentioned above with reference to FIG. 8, is set to a maximum count value of 60.

Additions, subtractions, and other modifications of the preferred embodiments of the invention will be apparent to those practiced in this field and are within the scope of the following claims.

What is claimed is:

1. A method for scheduling I/O requests directed to logical volumes residing on physical storage devices of a data storage system, comprising:

determining a job workload for each of the physical storage devices and pipes which define DMA paths to the physical storage devices;

choosing at least one of the physical storage devices based on the job workload;

selecting one of the logical volumes a logical volume associated with the chosen at least one physical storage device; and selecting an I/O request directed to the selected one of the logical volumes.

2. The method of claim 1, wherein the pipes each comprise at least one I/O bus for accessing the physical storage devices.

3. The method of claim 2, wherein determining comprises:

determining the number of pending jobs associated with each of the pipes.

4. The method of claim 3, wherein choosing comprises:

selecting one of the pipes based on the determined number off pending jobs associated with the pipes.

5. The method of claim 4, wherein the chosen one of the pipes is associated with a lowest number of pending jobs.

6. The method of claim 4, wherein the chosen one of the pipes is associated with a lowest number of pending jobs not in excess of a predetermined maximum pipe threshold number.

7. The method of claim 4, wherein the physical storage devices further comprise physical devices connected to the at least one I/O bus of the selected pipe.

8. The method of claim 7, wherein determining further comprises:
   determining the number of pending jobs associated with each of the physical devices.

9. The method of claim 8, wherein choosing comprises:
   selecting one of the physical devices based on the determined number of pending jobs associated with each of the physical devices.

10. The method of claim 9, wherein the selected one of the physical devices is associated with a lowest number of pending jobs.

11. The method of claim 9, wherein the selected one of the physical devices is associated with a lowest number of pending jobs not in excess of a predetermined maximum physical device threshold number.

12. The method of claim 9, wherein selecting one of the logical volumes comprises:
   determining a least recently selected one of those of the logical volumes associated with the selected one of the physical devices; and
   selecting the least recently selected one.

13. The method of claim 8, wherein at least two of the physical devices have a lowest number of pending jobs and wherein choosing comprises:
   selecting one of the at least two of the physical devices in a round robin manner.

14. The method of claim 8, wherein at least two of the physical devices have a lowest number of pending jobs and wherein choosing comprises:
   selecting one of the at least two of the physical device in a round robin manner if the lowest number of pending jobs is not in excess of a predetermined maximum physical device threshold number.

15. The method of claim 3, wherein at least two of the pipes have a lowest number of pending jobs and wherein choosing comprises:
   determining which of the at least two of the pipes is idle; and
   if more than one of the at least two of the pipes are idle, then selecting from the more than one of the at least two of the pipes.

16. The method of claim 15, wherein choosing further comprises:
   if only one of the at least two of the pipes is idle, selecting the idle one of the at least two of the pipes.

17. The method of claim 15, wherein choosing further comprises:
   if only one of the at least two of the pipes is idle, selecting the idle one of the at least two of the pipes if the number of pending jobs is not in excess of a predetermined maximum pipe threshold number.

18. The method of claim 2, wherein the physical resources further comprise physical devices connected to the at least one I/O bus of each of the pipes.

19. The method of claim 1, further comprising:
   determining if the I/O requests include host I/O requests and non-host I/O requests; and
   if the I/O requests are determined to include host I/O requests and non-host I/O requests, deciding whether or not the host I/O requests are to be considered for scheduling.

20. The method of claim 19, wherein deciding comprises using a parameter corresponding to the probability that the host I/O requests will be considered for scheduling if one or more of the I/O requests are non-host I/O requests.

21. The method of claim 19, further comprising:
   selecting one of any of the host I/O requests if it is decided that the host I/O requests are to be considered for scheduling.

22. An apparatus for scheduling I/O requests directed to logical volumes residing on with physical storage devices of a data storage system, comprising
   a stored computer program in memory instituting the steps of
   determining a job workload for each of the physical storage devices and pipes which define DMA paths to the physical storage devices;
   choosing at least one physical storage device based on the job workload;
   selecting one of the logical volumes associated with the chosen at least one physical storage device; and
   selecting an I/O request directed to the selected one of the logical volumes.

23. The apparatus of claim 22, wherein the pipes each comprise at least one I/O bus for accessing the physical storage devices.

24. The apparatus of claim 23, wherein the program instituted step of determining comprises:
   determining the number of pending jobs associated with each of the pipes.

25. The apparatus of claim 24, wherein the program instituted step of choosing comprises:
   selecting one of the pipes based on the determined number of pending jobs associated with the pipes.

26. The apparatus of claim 25, wherein the chosen one of the pipes is associated with a lowest number of pending jobs.

27. The apparatus of claim 25, wherein the chosen one of the pipes is associated with a lowest number of pending jobs not in excess of a predetermined maximum pipe threshold number.

28. The apparatus of claim 25, wherein the physical storage devices further comprise physical devices connected to the at least one I/O bus of the selected pipe.

29. The apparatus of claim 28, wherein the program instituted step of determining further comprises:
   determining the number of pending jobs associated with each of the physical devices.

30. The apparatus of claim 29, wherein the program instituted step of choosing comprises:
   selecting one of the physical devices based on the determined number of pending jobs associated with each of the physical devices.

31. The apparatus of claim 30, wherein the selected one of the physical devices is associated with a lowest number of pending jobs.

32. The apparatus of claim 30, wherein the selected one of the physical devices is associated with a lowest number of pending jobs not in excess of a predetermined maximum physical device threshold number.

33. The apparatus of claim 30, wherein the program instituted step of selecting one of the logical volumes comprises:

determining a least recently selected one of those of the logical volumes associated with the selected one of the physical devices; and selecting the least recently selected one.

34. The apparatus of claim 29, wherein at least two of the physical devices have a lowest number of pending jobs and wherein the program instituted step of choosing comprises:

selecting one of the at least two physical devices in a round robin manner.

35. The apparatus of claim 29, wherein at least two of the physical devices have a lowest number of pending jobs and wherein the program instituted step of choosing comprises:

selecting one of the at least two physical devices if the lowest number of pending jobs is not in excess of a predetermined maximum physical device threshold number.

36. The apparatus of claim 24, wherein at least two of the pipes have a lowest number of pending jobs and wherein the program instituted step of choosing comprises:

determining which of the at least two of the pipes is idle; and if more than one of the at least two of the pipes are idle, then selecting from the more than one of the at least two of the pipes.

37. The apparatus of claim 36, wherein the program instituted step of choosing further comprises:

if only one of the at least two of the pipes is idle, selecting the idle one of the at least two of the pipes.

38. The apparatus of claim 36, wherein the program instituted step of choosing further comprises:

if only one of the at least two of the pipes is idle, selecting the idle one of the at least two of the pipes if the number of pending jobs is not in excess of a predetermined maximum pipe threshold number.

39. The apparatus of claim 23, wherein the physical resources further comprise physical devices connected to the at least one I/O bus of each of the pipes.

40. The apparatus of claim 22, further wherein the program institutes the step of determining if the I/O requests include host I/O requests and non-host I/O requests, and, if the I/O requests include host I/O requests and non-host I/O requests, deciding whether or not the host I/O requests are to be considered for scheduling.

41. The apparatus of claim 40, wherein the program instituted step of deciding comprises using a parameter corresponding to the probability that the host I/O requests will be considered for scheduling if one or more of the I/O requests are non-host I/O requests.

42. The apparatus of claim 40, further wherein the program institutes the step of selecting one of any of the host I/O requests if it is decided that the host I/O requests are to be considered for scheduling.

43. A data storage system comprising:

a plurality of physical resources for supporting logical volumes, the plurality of physical resources including physical storage devices and pipes which define DMA paths to the physical storage devices;

a controller for selecting one of the logical volumes based on job workload of the pipes and the physical storage devices; and the controller selecting an I/O request directed to the selected one of the logical volumes for a new job generation.

* * * * *